(No Model.)

H. E. MOOMAW.
CAR COUPLING.

No. 450,085. Patented Apr. 7, 1891.

Witnesses
F. C. Gibson.
C. D. Davis

Inventor
H. E. Moomaw
By his Attorney
C. M. Alexander

UNITED STATES PATENT OFFICE.

HENRY E. MOOMAW, OF CARYVILLE, FLORIDA, ASSIGNOR OF ONE-HALF TO E. T. HINOTE, OF SAME PLACE.

CAR-COUPLING.

SPECIFICATION forming part of Letters Patent No. 450,085, dated April 7, 1891.

Application filed January 5, 1891. Serial No. 376,722. (No model.)

*To all whom it may concern:*

Be it known that I, HENRY E. MOOMAW, a citizen of the United States, residing at Caryville, in the county of Washington and State of Florida, have invented certain new and useful Improvements in Car-Couplings, of which the following is a specification, reference being had therein to the accompanying drawings, in which—

Figure 1:
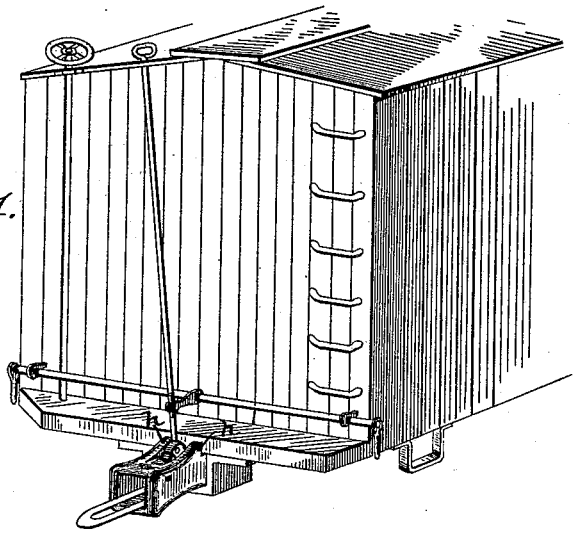
Figure 2:
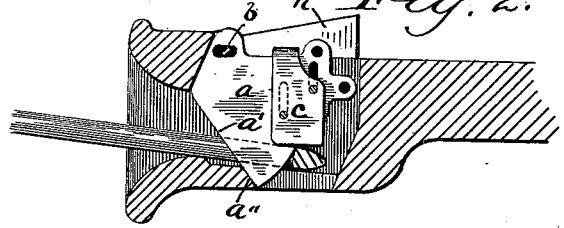
Figure 3:
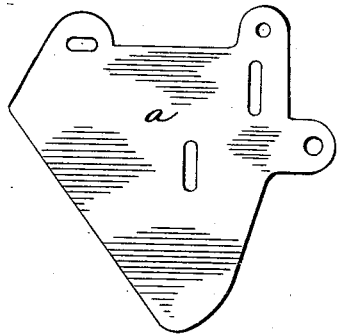
Figure 4:
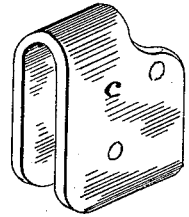

Figure 1 represents a perspective view of one end of an ordinary box-car provided with my improvements; Fig. 2, a vertical longitudinal sectional view, and Figs. 3 and 4 detail views of the automatic dog and link depressor.

The invention has for its object the provision of improved and simple means for automatically coupling cars when they come together; and it consists in certain novel improvements and combinations of parts that will be fully hereinafter described, and particularly pointed out in the claims appended.

The invention has particular reference to improvements upon the coupling covered by Letters Patent No. 433,902, and issued to me on the 5th day of August, 1890, as will presently appear.

Referring to the annexed drawings by letter, $a$ designates a plate or dog of approximately triangular shape adapted to work in a vertical longitudinal slot in the top of the draw-head. The draw-head is practically of the ordinary shape, except that it is preferably a little larger at its forward end and provided with a wider flaring mouth than the ordinary form in order that the links may enter more readily than usual. The draw-head is connected to the car-frame in any suitable or improved manner, and it is provided on its upper side with a pair of abutments $h$ $h$, which abut against the end beam of the car, and thereby prevent injury to the upper projecting end of the dog by preventing the draw-head from being forced too far under the car. The upper forward end of the dog is pivotally secured in the slot by a transverse horizontal pin $b$, which is secured in the draw-head and passes through a horizontal slot formed in the dog, this slot permitting or allowing the same a limited forward and backward movement in the slot. The forward upper end of the dog is inclined forwardly and downwardly, and abuts against the similarly-inclined wall of the forward end of the slot and its front rearwardly-inclined edge $a'$ abuts against the rearwardly-inclined wall $a''$ of a recess or opening in the bottom of the draw-head. The rear end of the dog is provided with one or more perforated ears for the attachment of the operating-rods. The lower portion of the rear edge of the dog is curved downwardly and forwardly in order to facilitate the withdrawal of the dog from the link, as set forth in my former patent.

Connected to the rear upper end of the dog is a gravitating link depressor or holder $c$, which preferably consists of a pair of plates arranged upon opposite sides of the dog and connected together at their upper ends, thus forming practically a U-shaped casting adapted to embrace the dog. This gravitating holder is connected to the dog by pins which pass through vertical slots in the same, thereby securely attaching the device thereto, but allowing it a limited vertical movement, as is evident. This device $c$ is adapted to rest upon the inner end of the link when the same is in the draw-head and keep its forward end elevated and in proper position to enter the adjacent draw-head when the cars come together, thereby avoiding the danger of having to put the hand between the approaching draw-heads to hold up the link. The essential advantage of this link-holding device is that it not only readily and automatically adjusts itself to variations in the thicknesses in the links, but it also accommodates itself to and has a tendency to prevent the vibrations of the link while the cars are in motion without in the least disturbing the dog, the holder being, of course, of sufficient weight to accomplish these objects.

In operation the entering link strikes against the forward rearwardly-inclined edge of the dog and automatically lifts the same and passes beyond it, whereupon the rear end of the dog by its own weight drops down through the link and prevents its withdrawal, the gravitating depressor or holder keeping the link in a horizontal position, as before explained. Any form of link may be employed in this coupler; but I prefer one slightly pointed at its ends, as shown.

By enlarging the pin-hole in the dog and by inclining the front walls of the upper and lower slots in the manner shown and described it will be observed that the said horizontal pin will be entirely relieved of all strain, the strain being exerted upon the oppositely-inclined front walls of the upper and lower slots, as is evident. This relieving the pivotal pin of the pulling strain entirely renders the device very strong and durable. It will be observed that the dog, when subjected to the pulling strain, exerts a sort of wedging action against the oppositely-inclined walls of the slots, and that therefore the greater the strain the tighter will the dog be held.

I may employ any suitable devices to operate the dog in uncoupling; but I prefer the means shown in Fig. 1, which are substantially the same as the devices shown and described in my former patent hereinbefore referred to, and which consists of a rock-shaft journaled on the end of the car and provided at its ends (which extend to the sides of the car) with operating-handles, this rock-shaft being also provided with an arm which is connected to the dog by a rod. A vertical rod is connected to this arm and extends to the top of the car. These devices enable the coupling devices to be operated from either side or the top of the car, thereby avoiding the necessity of going between the cars for that purpose.

It will be observed in Fig. 2 that the rear portion of the bottom of the mouth of the draw-head is hollowed out or depressed in order that the link-depressor may depress the inner end of the link and elevate the forward end thereof to a proper position to readily enter the adjacent draw-head when the cars come together.

Having thus fully described my invention, what I claim is—

1. The combination of a draw-head slotted longitudinally in its upper side, the dog pivoted at its upper forward end in this slot, the pivotal pin passing through a horizontal slot in the dog, the upper and lower ends of this dog being oppositely and rearwardly inclined and adapted to abut against similarly-inclined walls in slots in the draw-head, the rear lower edge of this dog being downwardly and forwardly curved, a gravitating link-depressor carried by the said dog, and means for operating the dog, all arranged as and for the purposes herein set forth.

2. The combination of a draw-head slotted longitudinally in its upper side, an automatic dog pivoted in this slot at the forward end thereof, and a link-depressor consisting of a pair of connected plates embracing the rear end of the said dog, this depressor being connected to the dog by means of vertical slots and pins, whereby it may have a limited independent vertical movement thereof, substantially as described.

In testimony whereof I affix my signature in presence of two witnesses.

HENRY E. MOOMAW.

Witnesses:
W. M. CHRISTMAN,
ARTHUR BURGOYNE.